United States Patent
Rowe et al.

(10) Patent No.: US 6,629,313 B1
(45) Date of Patent: Sep. 30, 2003

(54) IN-LINE DATABASE ACCESS STATEMENTS WITHOUT A PRE-COMPILER

(75) Inventors: Dean Rowe, Redmond, WA (US); David Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 09/606,960

(22) Filed: Jun. 29, 2000

(51) Int. Cl.$^7$ .............................. G06F 9/45; G06F 17/30; G06F 7/00

(52) U.S. Cl. ................. 717/136; 717/137; 717/140; 717/141; 717/142; 717/143; 707/3; 707/4

(58) Field of Search ................. 717/136, 137, 717/140–143; 707/3, 4, 10, 102, 103, 103 R, 103 Y, 104.1

(56) References Cited

U.S. PATENT DOCUMENTS

| | | | |
|---|---|---|---|
| 5,230,049 A | * 7/1993 | Chang et al. | 717/143 |
| 5,504,885 A | * 4/1996 | Alashqur | 717/141 |
| 5,664,173 A | * 9/1997 | Fast | 707/4 |
| 5,761,493 A | * 6/1998 | Blakeley et al. | 707/4 |
| 6,063,133 A | * 5/2000 | Li et al. | 717/136 |
| 6,378,126 B2 | * 4/2002 | Tang | 717/143 |

OTHER PUBLICATIONS

"OLE DB Product Information," [online] Aug. 7, 1997 [accessed Dec. 16, 2002], Retrieved from Internet <URL: http://www.microsoft.com/data/oledb/prodinfo.htm>, pp. 1–2.*

"About Microsoft COM," [online] Aug. 13, 1999 [accessed Dec. 13, 2002], Retrieved from Internet <URL: http://www.microsoft.com/com/about.asp>, p. 1.*

* cited by examiner

Primary Examiner—Gregory Morse
Assistant Examiner—Eric B. Kiss
(74) Attorney, Agent, or Firm—Woodcock Washburn LLP (57) ABSTRACT

Systems and methods that enable a source code file containing in-line database access statements to be compiled into object code for an application without the use of a pre-compiler are disclosed. In one aspect of the system, the source code contains delimiters that enclose an attribute section comprising in-line database access statements. The compiler of the system communicates the attribute section to an attribute provider, which translates the attribute section into statements that can be processed by the compiler. A further aspect of the system is that the attribute provider is a software component. The software component can be a COM (Component Object Model) component. A still further aspect of the system is that the attribute provider can communicate with a database management system in order to assist in validating the attributes against the tables and columns of the database.

32 Claims, 3 Drawing Sheets

IN-LINE DATABASE ACCESS STATEMENTS WITHOUT A PRE-COMPILER

FIELD OF THE INVENTION

This invention relates generally to computer programming language compilers, and more particularly to embedding database access statements in the source code submitted to such compilers.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright ©2000, Microsoft Corporation, All Rights Reserved.

BACKGROUND OF THE INVENTION

Many software applications require a database to persistently store data used by the application. As a result, software developers need to design software that interfaces with database software. In general, database management software provides one or both of two types of interfaces, an API (Application Program Interface), or an embedded language style interface.

In the case where the database software interface is through an API, the database management software provides a set of methods (also known as functions) that are called from within the application program software. The methods typically cause the database management system to read, write, and update rows in the database. In addition methods are provided that bind columns to variables, and that provide session and transaction support. The methods typically take parameters that control or modify the behavior of the method, and receive output from the method. It is often the case that a SQL (Structured Query Language) statement will be one of the parameters to a method or function.

In the case of an embedded language interface, the database management system vendor defines a database access language in a grammar that is specific to the vendor. Typically the grammar will support SQL statements. In order to develop software that accesses a database, a software developer embeds statements in the database access language into the source code for the software. Thus, the database access language statements are interspersed with native programming language statements, such as C/C++ statements. The developer must then run what is known as a pre-compiler on the source code. The pre-compiler is a parser application provided by the database management system vendor that is able to parse the embedded statements in the database access grammar. The developer submits the source code file to the pre-compiler. The pre-compiler ignores statements in the native source code and only processes those statements in the database access language. The database language statements are translated into native programming language statements. The original native programming language statements and the statements translated from the database programming language are output to a processed source code file. The processed source code file is then submitted to a native programming language compiler, which produces an object file.

There are significant disadvantages in both of the above-mentioned systems. In the API based system, SQL statements that are provided as parameters must typically be enclosed within quotation marks to avoid the native language compiler from attempting to parse the SQL statement as a native programming language statement. If the statement itself uses quotes, special characters are often required to prevent the compiler from becoming confused by the multiple sets of quotes (one or more in the statement, and the statement enclosing quotes). Furthermore, SQL statements can often be quite long and require multiple lines in the source code. Often the developer must either insert special end of line characters at the end of each line prevent the compiler from terminating the expression prematurely, or attempt to squeeze the statement on a single long line that renders the statement hard to read.

Systems employing the embedded language method also have significant disadvantages. In addition to the problems noted above, the pre-compiler adds complexity to the development process because the developer must remember to invoke the pre-compiler, or must modify scripts to cause the pre-compiler to be invoked. In addition, developers must manage two sets of files, the pre-compiled source code and the translated source code.

Therefore, there is a need in the art for a system that provides a way for developers to embed database language code into native programming language source code files without requiring the use of a pre-compiler.

SUMMARY OF THE INVENTION

The above-mentioned shortcomings, disadvantages and problems are addressed by the present invention, which will be understood by reading and studying the following specification.

The present invention includes systems and methods that enable a source code file containing in-line database access statements to be compiled into object code for an application without the use of a pre-compiler. In one aspect of the system, the source code contains delimiters that enclose an attribute section comprising in-line database access statements. The compiler of the system communicates the attribute section to an attribute provider, which translates the attribute section into statements that can be processed by the compiler.

A further aspect of the system is that the attribute provider is a software component. The software component can be a COM (Component Object Model) component.

A still further aspect of the system is that the attribute provider can communicate with a database management system in order to assist in validating the attributes against the tables and columns of the database.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods of an exemplary embodiment of the invention are provided. In the fourth section, a particular COM (Microsoft's Component Object Model) object repository implementation of the invention is described. Finally, in the fifth section, a conclusion of the detailed description is provided.

Hardware and Operating Environment

Figure 1:
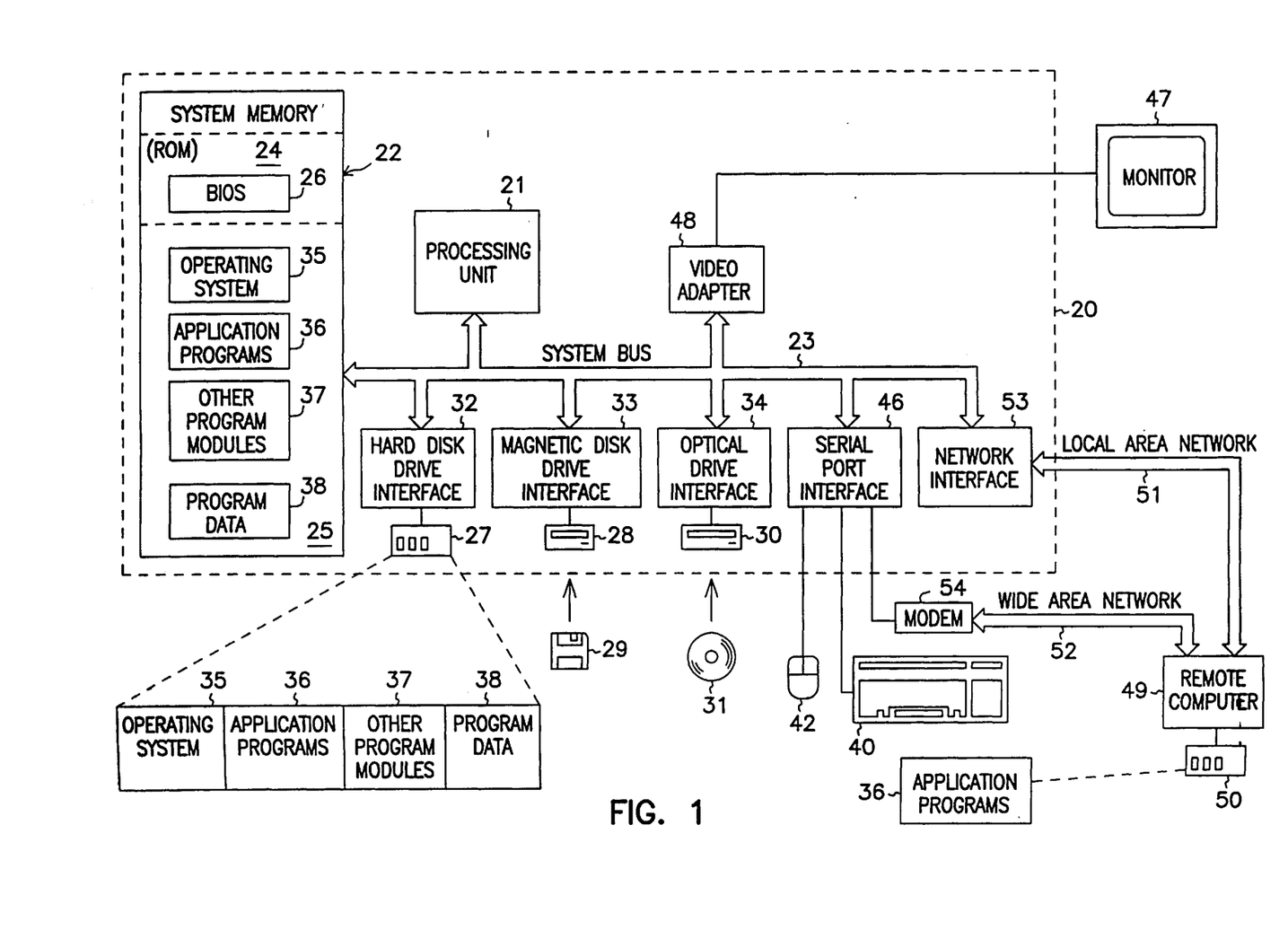
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
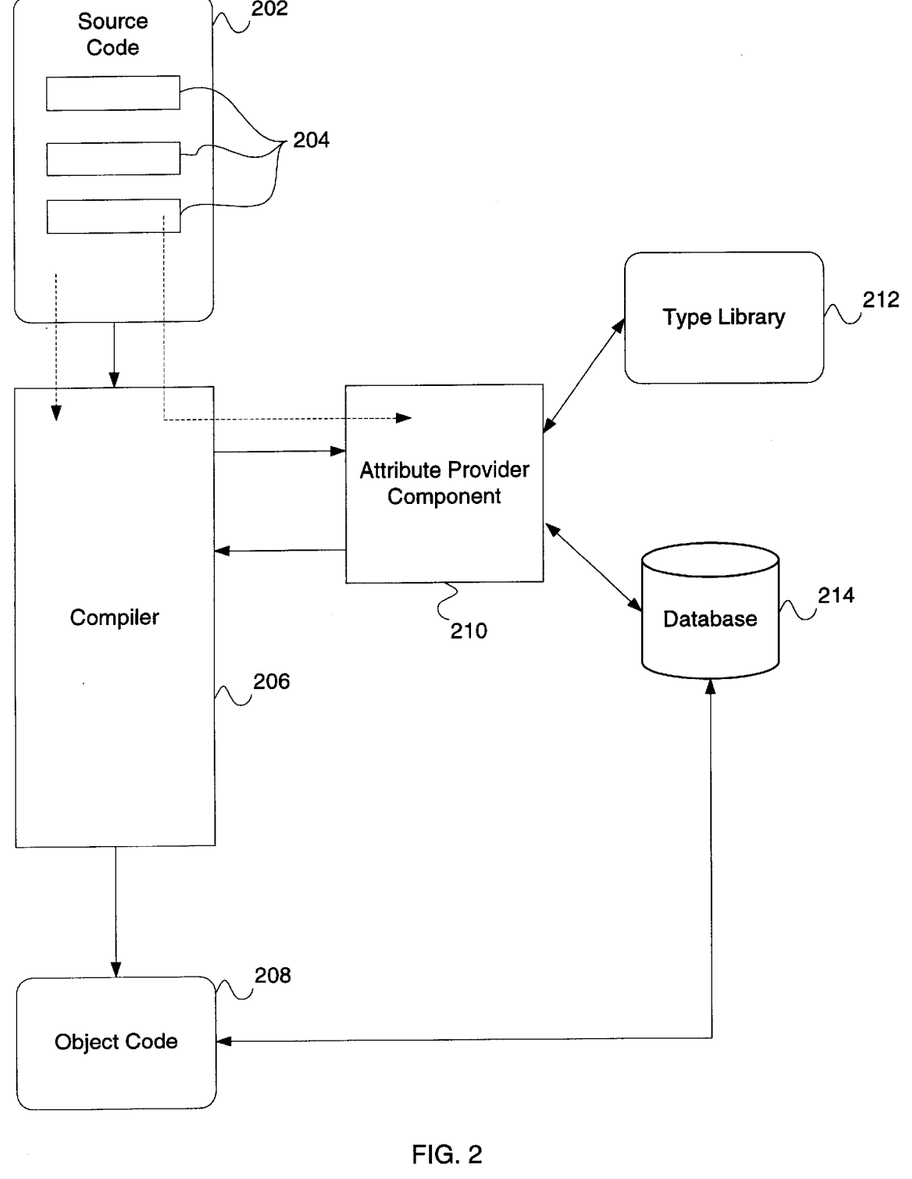
FIG. 2 is a diagram illustrating a system-level overview of exemplary embodiments of a source code compiler system.

A system level overview of the operation of an exemplary embodiment of the invention is described by reference to FIG. 2. The concepts of the invention are described as operating in a multiprocessing, multithreaded virtual memory operating environment on a computer, such as computer 20 in FIG. 1. In this environment compiler 206 receives as input a source code file 202, and translates the source code into an object code file 208 that contains instructions that can be executed by a computer, such as computer 20.

Source code file 202 can comprise computer source written in any of a number of programming languages known in the art. Source code file 202 contains statements that conform to a first programming language, which will be referred to as the primary language. Examples of such languages includes C/C++, Visual Basic, Java, Ada, Pascal, and Smalltalk etc. The invention is not limited to any particular programming language. Generally, source code file 202 will be one of many source code files associated with a software application. Further, source code file 202 can contain statements that are designed to read or write data to database 214.

In addition to primary language statements, source code file 202 contains one or more attribute sections 204 that comprise statements that conform to a second programming language system. In one embodiment of the invention, the second programming language comprises the Structured Query Language, or SQL. SQL, as is known in the art, provides a mechanism for interacting with a database 214. Attribute sections 204 can be of varying lengths. For example, an attribute section 204 can be a single word that provides additional information regarding a particular variable. Alternatively, attribute section 204 can be a multiple line section comprising a complex SQL query that specifies data to be read from, or written to database 214.

In some embodiments of the invention, attribute sections 204 are enclosed within one or more delimiter characters. In one embodiment of the invention, a "[" delimiter character is used to introduce an attribute section and a matching "]" is used to conclude the attribute section. However, the invention is not limited to any particular attribute delimiter character. In general, the delimiter characters can be any character or string of characters that can be unambiguously interpreted as the beginning and end of an attribute section 204.

In further embodiments of the invention, the attribute sections are introduced by one or more delimiter characters and terminated by one or more predetermined language tokens. The predetermined language tokens can be an end-of-line token, an end of page token, or it can be any token that is inconsistent with an attribute token (i.e. a token in the primary language). As those of skill in the art will appreciate, many mechanisms for determining the start and end of a section of tokens embedded within primary language statements are possible and within the scope of the invention.

Attribute sections have what is known in the art as scope. The scope of an attribute section 204 depends on its position in source code file 202 relative to other entities in source code file 202. For example, an attribute section that immediately precedes a function or method declaration will be in scope for the duration of the function. An attribute that appears within a function will also be in scope for the duration of the function. An attribute section that appears before a class definition will be in scope for all of the members of the class. An attribute that appears before a variable, property or parameter will have the same scope as the variable, property, or parameter.

As compiler 206 reads source code file 202, it parses the statements according to the grammar of the primary programming language. The parsed statements are translated into object code instructions that are intended to be executed by a particular type of processor. In addition, as compiler 206 reads source code file 202, it will parse an attribute delimiter character. Upon seeing such a character, the compiler submits the attribute section 204 to an attribute provider 210. In one embodiment of the invention, attribute provider 210 is a software module that is designed to parse a secondary programming language, such as SQL. Attribute provider 210 translates the statements and/or expressions in the secondary programming language into statements and expressions in the primary language, and provides the translation to compiler 206, effectively inserting the translation into the source 202. Compiler 206 then generates computer-executable instructions that implement the logic expressed by the statements for insertion into object code file 208.

In some embodiments of the invention, attribute provider 210 is what is known in the art as a component. It is desirable that attribute provider 210 be a component because it provides a mechanism for easily replacing components and for extending the system to handle multiple types of attributes. For example, new attribute provider components can be provided that fix defects (i.e. "bugs") in the component it replaces. Alternatively, new components can be provided that add functionality, or that handle new types of attributes. In one embodiment of the invention attribute provider 210 is a COM (Component Object Model) component. In an alternative embodiment of the invention, attribute provider 210 can be a Java bean component. The invention is not limited to any particular component object model.

Attribute provider 210 can access other entities in order to aid in the parsing, translation and validation of attribute sections 204. For example, in one embodiment of the invention, attribute provider 210 can access a type library 212 defining type information for other software modules accessible to attribute provider 210. In general, a type library contains a programming language independent description of the interfaces and methods exposed by the objects described by the type library. In some embodiments of the invention, these objects are COM objects, however the invention is not limited to any particular type of object. In an exemplary embodiment, the type library 212 can provide type definitions for data access components that attribute provider 210 can use to generate code as part of its translation process.

In addition, in one embodiment, attribute provider 210 can access a database 214 to assist in the translation process. The ability to access a database 214 is desirable, because it provides a mechanism for attribute provider 210 to provide validation and error checking for code in attribute sections 204. For example, if an attribute section 204 contains an expression that binds a variable to a database column, attribute provider 210 can examine database 214 to determine that the column specified in the attribute section exists. Similarly, if the attribute section 204 contains references to databases or tables, attribute provider 210 can examine database 214 to make sure the referenced database or table actually exists. If the database or table does not exist, attribute provider 210 can generate an error message to be displayed by compiler 206.

In some embodiments of the invention, compiler 206 can select from a plurality of attribute providers 210. The selection of a particular attribute provider can be determined by a type associated with the attribute. For example, the attribute can be in a tertiary language distinct from the primary and secondary languages. The compiler (or parser within the compiler) can then submit the attribute section to the appropriate attribute provider based on the attribute type.

Further details regarding the operation of the above-described components are provided in the following sections.

Methods of an Exemplary Embodiment of the Invention

In the previous section, a system level overview of the operation of an exemplary embodiment of the invention was described. In this section, the particular methods of various embodiments of the invention performed by an operating environment executing an exemplary embodiment are described by reference to a flowchart shown in FIG. 3. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIG. 3 are inclusive of the acts required to be taken by an operating environment executing an exemplary embodiment of the invention.

Figure 3:
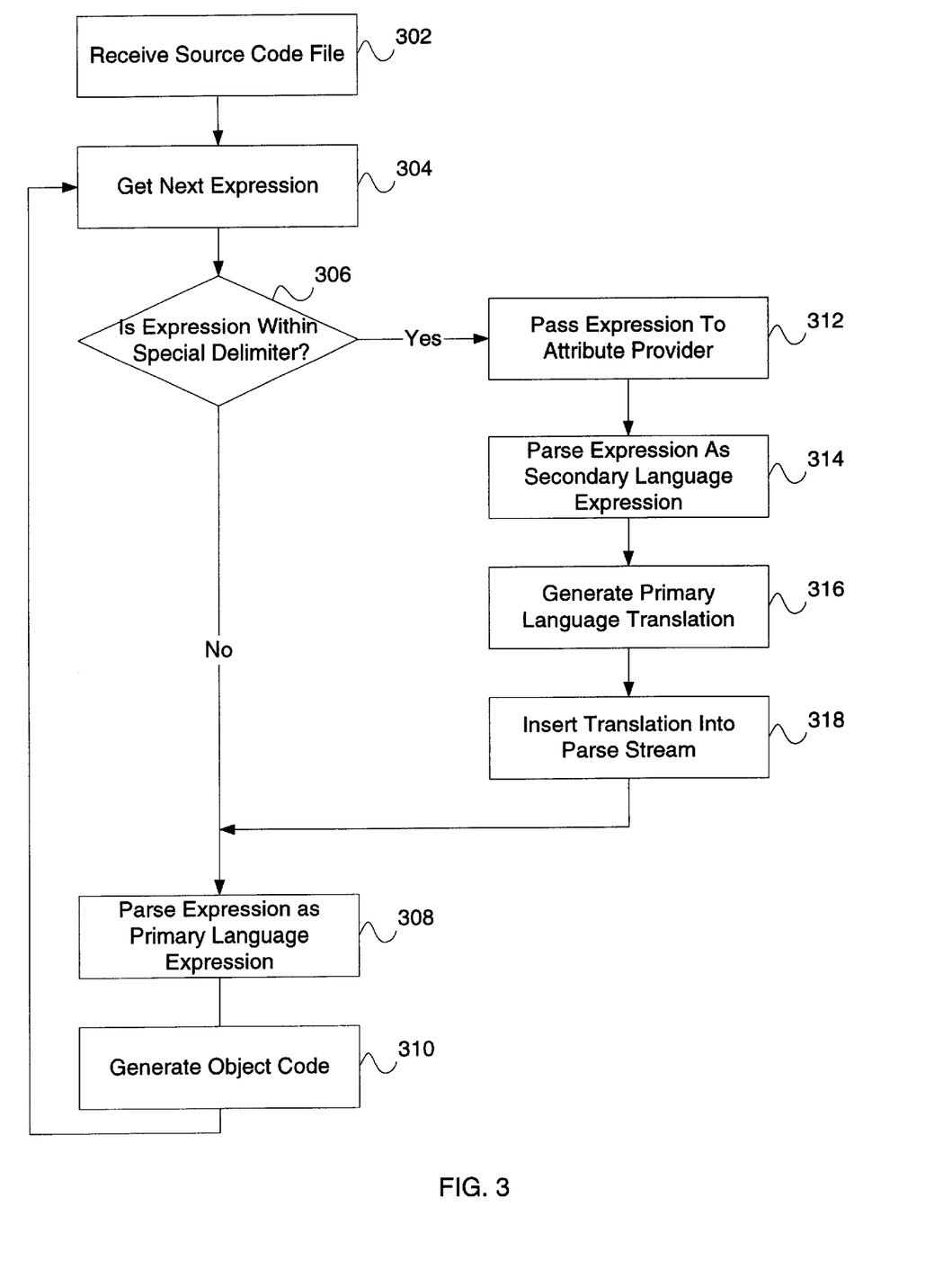
FIG. 3 is a flow diagram illustrating methods of processing in-line database access statements according to exemplary embodiments of the invention.

In FIG. 3, a method according to one embodiment of the invention for processing secondary language statements that are embedded in-line with primary language statements is shown. The method begins when a program, such as compiler 206, receives as input a source code file for compilation (block 302). As noted above, the source code file will contain expressions in primary programming language such as C/C++, Java, Ada, etc. The invention is not limited to any particular primary programming language.

Block 304 is the top of loop that parses the statements and expressions in the input source code file. Block 304 obtains the next available expression to be parsed, unless no further unprocessed expressions or statement remain in the source code file. Next, a check is made to determine if the expression is delimited by an attribute delimiter character (block 306). In one embodiment of the invention, the "[" character begins an attribute section, and the "]" concludes an attribute section. In alternative embodiments, the attribute section is introduced by a delimiter string, and terminated by a predetermined token such as an end-of-line character, an end-of-page character, or a token that is inconsistent with the syntax of the secondary language. If the expression is not within an attribute delimiter, then the compiler proceeds to parse the expression as a primary language expression (block 308). The parsed expression is then used to generate object code that is output to an object code file (block 310). The object code may be object code for a particular processor and operating system environment, or it can be an intermediate language representation of object code that will later be translated into object code for a particular processor and operating system environment. After generating the object code, the system executing the method returns to block 304 to get the next expression.

However, if the check at block 306 determines that the expression is within a delimiter character, the expression is passed to an appropriate attribute provider (block 312). Attribute provider then parses the expression as a secondary language expression (block 314). For example, the secondary language can be a SQL language expression. The secondary language expression is then translated into a primary language expression (block 316). The primary language expression that is generated will depend on the contents and placement of the secondary language expression within the primary language statements. For example, if the attribute section precedes a class definition, then the generated primary language code will modify the class. If the attribute section is within a class member function, the generated primary language code will modify the function.

After the primary language code is generated, it is returned to the compiler, inserting the generated primary language into the parse stream as if the compiler had read the generated statements from the input source code file (block 318).

The particular methods for providing compilation of a secondary programming language embedded in-line within statements in a primary programming language performed by an operating environment to support various exemplary embodiments of the invention have been described. The methods have been shown by reference to a series of flowcharts including all the steps from 302 until 318.

Microsoft Visual Studio Implementation

In this section of the detailed description, a particular exemplary implementation of the invention is described that is implemented in Microsoft Visual Studio. In addition, a particular implementation is described in which the attribute provider is a component conforming to the Microsoft Component Object Model (COM).

Microsoft Visual Studio is a software development environment that incorporates various programming language compilers, a source code editor, and a symbolic debugger. Microsoft's Visual Basic, Visual C++, and Visual J++ programming language compilers are all supported within the Visual Studio environment.

In one exemplary embodiment, the compiler is the Visual C++ compiler. In this embodiment, the Visual C++ compiler reads source code files that have statements and expressions that conform to the C++ programming language. In addition, the source code can contain attribute sections delimited by the "[" and "]" characters. When the Visual C++ compiler encounters an attribute section, it passes the attribute section to an attribute provider, which parses the statements and expressions within the attribute section.

In this exemplary embodiment, the attribute provider supports various attributes. Included in the supported attributes are db_source, db_accessor, db_command, db_column, and db_param attributes. The attributes can modify parameters, variables, class members, and the class itself depending on the placement of the attribute. In the exemplary embodiment, the modifications to the class allow the class to perform as an OLE DB data class. A discussion of the various attributes and examples of the code generated by the attribute provider when the attributes are encountered in the C++ source code follows.

db_source

The db_source attribute identifies connection information necessary to open an OLE DB connection. This attribute can be applied to a class, or implemented within a class. In addition, the db_source attribute is used to add OLE DB datasource client properties to a class or within a function. If used within a function, the code will be injected within the function scope. Both the method level and class level attributes infer a OLE DB CDataSource and a CSession object. In the case of the class level, the inferred CSession becomes a member of the class, while at the method level it becomes a local. The general syntax of the db_source attribute is as follows:

[db_source(name=MyDb1, connectstring="")]
where:
name is the name assigned to a particular datasource or database;
connectstring is an OLE DB compliant connection string containing parameters to specify connection behavior.

The following excerpts provide two example C++ source code segments with in-line db_column attributes. The first example illustrates the db_source attribute appearing immediately before a class definition.

[
    db_source("Provider=MSDASQL;Data Source=OLE_DB_NWind_Jet")
]
class CMyDbsource
{
};

In this example, the code is generated that adds a method called OpenDataSource, which contains the necessary commands to open the datasource for the connection string that is passed as a parameter to the db_source command.

The second example illustrates the db_source attribute appearing outside of any class definitions. In this example, the "MyDb2" parameter specifies the name of the local variable that will be created.

[db_source("MyDb2", "Provider=MSDASQL; Data Source=OLE_DB_NWind_Jet")];

In this example the generated code comprises the code necessary to open up the data source within the function where the attribute is placed.

db_column

The db_column attribute is a member attribute, which identifies a C++ member variable and associates it with an ordinal column position or a column name within a rowset. It is desirable to provide both means for accessing a column by its ordinal position or its column name because doing so provide flexibility to a software developer. In one embodiment of the invention, column names are resolved at runtime, when the db_command attribute is opened. However, the invention is not so limited, and the column name can be resolved at compile time. The general syntax for a db_column attribute is:

[db_column(ordinal=#[, colname=COLUMNNAME] [, dbtype=DBLONG] [, statusfield=STATUSFIELD] [, length=LENGTHFIELD])]
where:
ordinal is the column position within the rowset;
colname is the column name defined by the rowset;
dbtype is the database type of the column;
statusfield is a variable which will contain the status of the field;
length is a variable which will contain the length of the field;

The following excerpt provides an example C++ source code segment with in-line db_column attributes:

| | | |
|---|---|---|
| [db_column (1, DBTYPE_I4)] | long | nValue; |
| [db_column (2)] | TCHAR | szName [80]; |
| [db_column (3)] | TCHAR | szCity [30]; |

In response to the above example, the attribute provider generates the following code:
COLUMN_ENTRY_TYPE(1, DBTYPE_I4, nValue);
COLUMN_ENTRY(2, szName);
COLUMN_ENTRY(3, szCity);

In one embodiment of the invention, the generated code includes the C++ macros COLUMN_ENTRY_TYPE and COLUMN_ENTRY defined by the ATL OLE DB template classes. In alternative embodiments of the invention, native programming language code such as C++ can be generated instead of the macros.

db_param

The db_param attribute is a member attribute that identifies a C++ member variable and associates it with an input or output parameter associated with an OLE DB command. The general syntax is as follows:

[db_param(ordinal=1,paramtype="DB_PARAMIO_INPUT")]
where:
ordinal is the ordinal position of the parameter within the command;
paramtype specifies whether the parameter is an input parameter, an output parameter, or both input and output.

The following excerpt provides an example C++ source code with in-line db_param attributes:

[db_param(1, DB_PARAMIO_INPUT)] long nInput1;

In response to the above example, the attribute provider generates the following code:
SET_PARAM_TYPE(DB_PARAMIO_INPUT)
COLUMN_ENTRY(1, nInput1) The generated code includes the C++ macros SET_PARAM_TYPE and COLUMN_ENTRY defined by the ATL consumer template library.

db_accessor

The db_accessor attribute modifies the underlying OLE DB accessor for subsequent db_column and db_param attributes within the same class or function. This attribute is useable at a class member level and is used to group db_column attributes that participate in OLE DB IAccessor based binding. It is used in conjunction with either the db_table or db_command attributes. In effect this attribute infers the use of the OLE DB Consumer Template MACRO set of BEGIN_ACCESSOR . . . END_ACCESSOR. When one or more db_accessor attributes are specified, the code generated by the attribute provider will generate a rowset and bind it to the corresponding accessor maps. The accessor number is automatically calculated, starting with 0. If a db_accessor is not specified, accessor 0 will automatically be generated, and all bindings will be mapped to this accessor block. The general syntax for the db_accessor attribute is as follows:

[db_accessor(auto=true)]
        where:
            Auto identifies whether or not data in this accessor will be automatically fetched when moving from row to row.

The following excerpt provides an example C++ source code with in-line db_accessor attributes:

```
[db_accessor]
    [db_param (1, DB_PARAMIO_INPUT)]    long    nInput1;
    [db_column (1, DBTYPE_I4))          long    nValue;
    [db_column (2)]                     TCHAR   szName
                                                [80];
    [db_column (4)]                     TCHAR   szCity [30];
[db_accessor (false)]
    [db_column (3)]                     BYTE    bytPicture
                                                [4096];
```

In response to the above example, the attribute provider generates the following code:

```
    long        nInput1;
    long        nValue;
    TCHAR       szName [80];
    TCHAR       szCity [30];
    BYTE        bytPicture [4096];
```

BEGIN_ACCESSOR_MAP (MyClassName, 2)
        BEGIN_ACCESSOR(0, true)
            COLUMN_ENTRY_TYPE(1, DBTYPE_I4, nValue);
            COLUMN_ENTRY(2, szName);
            COLUMN_ENTRY(4, szCity);
        END_ACCESSOR( )
        BEGIN_ACCESSOR(1, false) // not an auto accessor
            COLUMN_ENTRY(3, bytPicture)
        END_ACCESSOR( )
    END_ACCESSOR_MAP( )
    BEGIN_PARAMETER_MAP(MyClassName)
        SET_PARAM_TYPE(DB_PARAMIO_INPUT)
        COLUMN_ENTRY(1, nInput1)
    END_PARAMETER_MAP( )

In the exemplary code generated above, the "MyClassName" string comprises the name of the class that the attribute is within.

As shown above, the generated code includes macros defined by OLE DB classes. These macros related to the db_accessor attribute include the BEGIN_ACCESSOR_MAP, BEGIN_ACCESSOR, END_ACCESSOR, and END_ACCESSOR_MAP. Other macros are included in the generated code related to attributes other than the db_accessor attribute. These attributes and macros have been described above.

db_command

The db_command attribute causes code to be generated that issues a command to a database management system, which will optionally return a rowset. The general syntax for using the attribute according to an embodiment of the invention is as follows:

[db_command(
        < db_command="SELECT*FROM AUTHORS">
        <, name=MyName>
        <, source_name=Db1>
        <, hresult=myHR>
        <, bindings="([bindto] foo, bar)([in] nID)">
    {
    ([bindtype]szVar1<, szVar2<, nVar3<, . . . >>>)
    any OLEDB Command
    ([bindtype]szVar1<, szVar2<, nVar3<, . . . >>>)
    continuation of OLEDB Command
    ([bindtype]szVar1<, szVar2<, nVar3<, . . . >>>)
    }]

where:
        db_command is the command text which will be passed into the OLE DB provider by the generated code. This can be either entered in the db_command parameter, or in braces after the end of the attribute.
        Name is the handle for working with the rowset.
        source_name is the Database or Session upon which this command will execute.
        Hresult identifies the variable which will receive the HRESULT of this database command. If the variable does not exist, it will be automatically injected (i.e. generated) by the attribute.
        Bindings allow a user to separate the binding parameters from the OLE DB command. If this parameter is specified, then the attribute provider will not parse the db_command parameter for [bindtype]. This usage provides for an OLE DB provider syntax that looks exactly like the attribute provider binding syntax, without requiring the developer to rewrite their OLE DB commands. To disable parsing db_command, without binding parameters, simply include Bindings="".
        ([bindtype]szVar1<, szVar2<,nVar3<, . . . >>>) is a bind parameter block. If the user specifies Bindings, the attribute provider will parse the associated value, otherwise, the attribute provider parses the db_command string for '(', followed by [bindtype] in square brackets, followed by one or more previously declared C++ member variables, followed by a closing parenthesis ')'. All text between the parenthesis is stripped from the resulting Command, and these parameters are used to construct column and parameter bindings for the command.
    ( marks the start of the data binding block.
    [bindtype] is one of the following case insensitive strings:
        [bindto] This variable binds to one of the columns in the rowset.
        [db_column] Same as [bindto].
        [in] Bind to one or more input parameters.
        [out] Bind to one or more output parameters.
        [in,out] Bind to one or more Input/Output parameter.
    szVarX resolves to a member variable within the current scope.

) marks the end of the data binding block

In the exemplary embodiment, [bindtype] syntax and the Bindings parameter are not valid when using db_command at the class level.

When Name is specified, the attribute provider generates a named class for traversing the rowset, or executing the action query multiple times. If Name is not specified, it is not possible to return more than one row of results to the user.

When the attribute provider encounters one or more of [in], [out], [in/out] expressions, the attribute provider builds a parameter map. When the attribute provider encounters one or more of [db_column] or [bindto] parameters, the attribute provider generates a rowset and an accessor map to service these bound variables. The accessor map created is similar to that create by the db_accessor attribute.

It should be noted that the db_command attribute can be used to execute commands, including SQL statements, that do not return a result set.

The following excerpts provide examples C++ source code with in-line db_command attributes. The first example illustrates a db_command for which the attribute provider will generate code that will retrieve a rowset:

```
HRESULT hr;
TCHAR szFname[80];
TCHAR szLname[80];
long nZip;
[db_command (name="Foo")
{
  SELECT FNAME, LNAME
  ([bindto] szFname, szLname)
  FROM AUTHORS
  WHERE ZIPCODE=?([in]nZip)
}];
nZip=98053; // Set the parameter
hr=Foo.Open(ds);
while(Foo.MoveNext( )==S_OK)
{
    ATLTRACE("\nFirst: %s Last: %s\n", szFname, szLname);
};
Foo.Close( );
```

The rowset can then be manipulated and accessed by the OLE DB Open, MoveNext, Close and related ATL OLE DB consumer template classes functions. The db_command takes a name parameter, which will cause the attribute provider to generate a variable with the indicated name. In the example above, this name is "Foo". Thus, when the next row is desired, the user calls Foo.MoveNext( )

The example C++ excerpt below contains attributes that will cause the attribute provider to generate code to automatically open the rowset, fetch the first row into the specified bind variables, then close the rowset:

```
HRESULT hr;
TCHAR szFname[80];
TCHAR szLname[80];
long nZip=98053;
[db_command
{
  SELECT FNAME([bindto]szFname), LNAME
    ([bindto]szLname)
  FROM AUTHORS
  WHERE ZIPCODE=?([in]nZip)
}];
ATLTRACE("\nFirst: %s Last: %s\n", szFname, szLname);
```

Like the example above, this exemplary C++ excerpt will cause the attribute provider to generate code to automatically open the rowset, fetch the first row into the specified bind variables, and then close the rowset. In this example, the bindings for result sets and input parameters are specified as parameters to the db_command attribute.

```
HRESULT hr;
TCHAR szFname[80];
TCHAR szLname[80];.
long nZip=98053;
[db_command (bindings="([bindto]szFname, szLname);
  ([in]nZip)")
{
  SELECT FNAME, LNAME
  FROM AUTHORS
  WHERE ZIPCODE=?
}];
ATLTRACE("\nFirst: %s Last: %s\n", szFname, szLname);
```

In the example below, the db_command attribute is passed parameters specifying OLE DB accessors that define the input and output bindings. The accessors can be established by a previously invoked db_accessor attribute. The attribute provider will generate code that retrieves a first row from the rowset, and places the results into the specified bound variables.

```
[db_command (UseConnection=DB1, AccessorClass=
    "MyAccessor")
{
  SELECT FNAME, LNAME
  FROM AUTHORS
  WHERE STATE =?
}];
``` db_table

The db_table attribute is very similar to db_command. Typically, it is used as a class level attribute. When invoked, the db_table attribute infers a class derived from CTable class of the OLE DB Consumer Templates. The syntax of the db_table attribute according to an embodiment of the invention is as follows:

```
[db_table(
    db_table="Table"
    [, name=MyName]
    [, source_name=MySource]
    [, hresult=MyHR]
)]
``` where:
db_table is the command text which is passed into OLE DB.
name is the handle for working with the rowset.
source_name is the Database or Session upon which this table will be opened.
hresult identifies the variable which will receive the HRESULT of this database table open. If the variable does not exist, it will be automatically injected (i.e. generated) by the attribute.

This section of the detailed description has described an embodiment of the invention and particular attributes. As will be appreciated by those skilled in the art, the invention is not limited to attributes having the names specified in the exemplary embodiments, or the parameters shown. The attribute names and parameters in the exemplary embodiment provide an indication of the functionality of the attribute, however, the invention is not limited to such functionality.

Conclusion

Systems and methods for compiling source code with embedded attributes have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while the embedded attribute command language has been described in terms of SQL compatible language, that other means of querying objects can be readily substituted. In addition, the embedded language can be OQL (Object Query Language).

The terminology used in this application is meant to include all of these environments. Therefore, it is manifestly intended that this invention be limited only by the following claims and equivalents thereof.

We claim:

1. A computerized method for compiling source code, the method comprising:
   receiving by a compiler a file having statements in a first programming language, and attributes in a second programming language;
   parsing the file into a set of expressions, said expressions comprising tokens, said tokens including an opening attribute delimiter string and an attribute terminator; and
   if the expressions are not enclosed within the opening attribute delimiter string and the attribute terminator then translating the expressions according to the first programming language into an object code, otherwise passing the expressions to an attribute provider, said attribute provider operative to perform the acts of:
      parsing the expressions according to the second programming language;
      generating statements in the first programming language from the parsed expressions;
      returning the generated statements to the compiler for translation into object code.

2. The computerized method of claim 1, wherein the first programming language is the C++ programming language.

3. The computerized method of claim 1, wherein the second programming language includes statements in the Structured Query Language (SQL).

4. The computerized method of claim 1, wherein the attribute terminator comprises an end-of-line character.

5. The computerized method of claim 1, wherein the attribute terminator comprises a closing delimiter string.

6. The computerized method of claim 5, wherein the opening delimiter string comprises an opening square brace ("[") character and the closing delimiter string comprises a closing square brace character ("]").

7. The computerized method of claim 1, further comprising validating the expressions passed to the attribute provider against a database.

8. The computerized method of claim 1, wherein the attribute provider is a software component.

9. The computerized method of claim 8, wherein the software component conforms to the Component Object Model (COM).

10. The computerized method of claim 1, wherein generating statements in the first programming language includes generating OLE DB class entities.

11. A computerized system comprising:
   a computer comprising a processor, a memory, and a computer-readable medium operatively coupled together;
   an operating environment executing in the processor from the computer-readable medium;
   an attribute provider operative to parse expressions in a secondary programming language and to translate the parsed expressions into expressions in a primary programming language; and
   a compiler running within the operating environment, said compiler operative to receive a file containing statements in a primary programming language and attributes in the secondary programming language, said compiler communicating the attributes to the first attribute provider and receiving translated expressions in the primary programming language.

12. The computerized system of claim 11, further comprising a second attribute provider; and wherein the file contains attributes in a tertiary programming language, the compiler communicating the attributes in the tertiary programming language to the second attribute provider and receiving translated expressions in the primary programming language.

13. The computerized system of claim 11, wherein the first attribute provider is a first software component.

14. The computerized system of claim 13, wherein the first software component conforms to the Component Object Model (COM).

15. The computerized system of claim 12, wherein the second attribute provider is a second software component.

16. The computerized system of claim 11, wherein the primary programming language is the C++ programming language.

17. The computerized system of claim 11, wherein the secondary programming language includes statements in the Structured Query Language (SQL).

18. The computerized system of claim 11, wherein the attribute provider is further operative to generate entities from a set of classes defined by a version of OLE DB.

19. The computerized system of claim 11, further comprising a database management system communicably coupled to the attribute provider.

20. The computerized system of claim 19, wherein the database management system is a relational database management system.

21. The computerized system of claim 19, wherein the database management system is an object oriented database management system.

22. The computerized system of claim 19, wherein the attribute provider is further operative to validate the expressions in the secondary programming language against the database system.

23. A computer-readable medium having computer-executable instructions for performing a method for compiling source code, the method comprising:
   receiving by a compiler a file having statements in a first programming language, and attributes in a second programming language;
   parsing the file into a set of expressions, said expressions comprising tokens, said tokens including an opening attribute delimiter string and an attribute terminator; and if the expressions are not enclosed within the opening attribute delimiter string and the attribute terminator then translating the expressions according to the first programming language into an object code, otherwise passing the expressions to an attribute provider, said attribute provider operative to perform the acts of:

parsing the expressions according to the second programming language;

generating statements in the first programming language from the parsed expressions;

returning the generated statements to the compiler for translation into object code.

24. The computer-readable medium of claim 23, wherein the first programming language is the C++ programming language.

25. The computer-readable medium of claim 23, wherein the second programming language includes statements in the Structured Query Language (SQL).

26. The computer-readable medium of claim 23, wherein the attribute terminator comprises an end-of-line character.

27. The computer-readable medium of claim 23, wherein the attribute terminator comprises a closing delimiter string.

28. The computer-readable medium of claim 27, wherein the opening delimiter string comprises an opening square brace ("[") character and the attribute terminator comprises a closing square brace character ("]").

29. The computer-readable medium of claim 23, wherein the method further comprises validating the expressions passed to the attribute provider against a database.

30. The computer-readable medium of claim 23, wherein the attribute provider is a software component.

31. The computer-readable medium of claim 30, wherein the software component conforms to the Component Object Model (COM).

32. The computer-readable medium of claim 23, wherein generating statements in the first programming language includes generating OLE DB class entities.

* * * * *